March 10, 1953  J. M. MacLEAN  2,631,055

PRESTRESSED RESILIENT WHEEL STRUCTURE

Filed April 13, 1948  2 SHEETS—SHEET 1

INVENTOR
J. M. MacLEAN
By: Fetherstonhaugh & Co.
ATT'YS

March 10, 1953  J. M. MacLEAN  2,631,055
PRESTRESSED RESILIENT WHEEL STRUCTURE
Filed April 13, 1948  2 SHEETS—SHEET 2
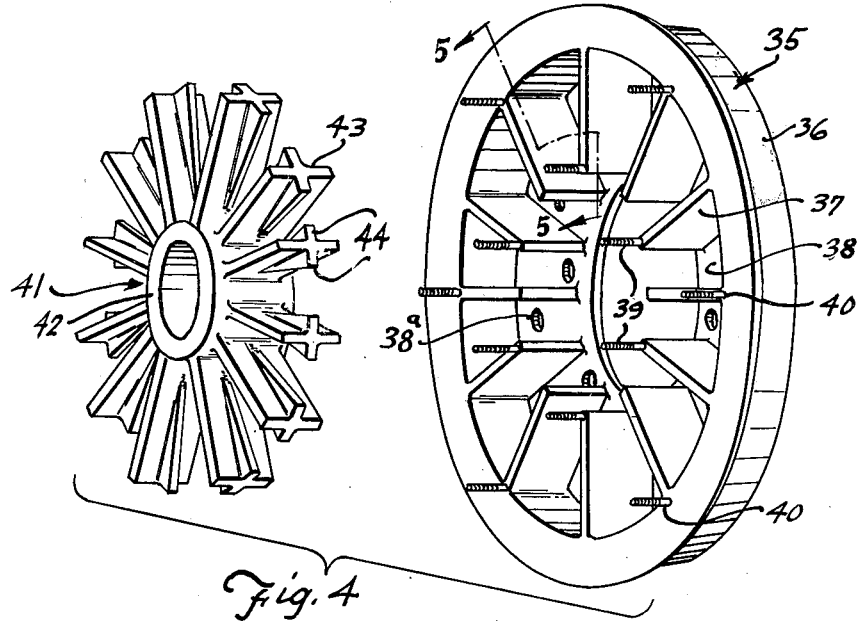
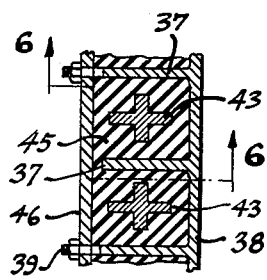
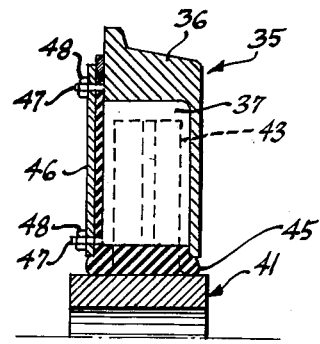
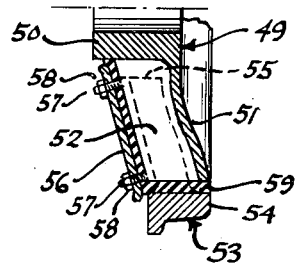
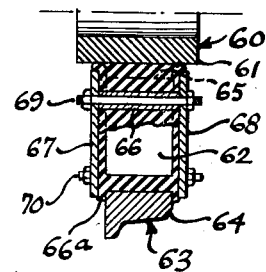
INVENTOR
J. M. MacLEAN
By: Fetherstonhaugh & Co.
ATT'YS Patented Mar. 10, 1953

2,631,055

UNITED STATES PATENT OFFICE 2,631,055

PRESTRESSED RESILIENT WHEEL STRUCTURE

James M. MacLean, Windsor, Ontario, Canada, assignor to Enjar Wheels, Limited, Windsor, Ontario, Canada, a corporation of Ontario Application April 13, 1948, Serial No. 20,615

3 Claims. (Cl. 295—11)

This invention relates to improvements in resilient wheels of the enclosed class and methods of assembly thereof.

This application is a continuation-in-part of my application re Enclosed Resilient Wheels, Serial No. 714,743, filed December 7, 1946, now Patent No. 2,532,319, and of my application for Blades for Resilient Wheels, Serial No. 726,643, filed February 5, 1947, now Patent No. 2,544,889.

In wheels of the resilient type of the class in which the wheel is comprised of an outer rim having blades extending inwardly therefrom and an inner hub with blades extending outwardly therefrom in spaced apart relation to the blades of the rim member and held in such relation by a resilient bonding medium, it will be apparent that the resilient bonding medium, such as rubber, in the upper area of the wheel will be in tension when a static gravity load is placed on the hub, assuming that the rubber material is placed within the wheel for a normal zero stress condition.

It is therefore the prime object of the present invention to provide means for instilling a predetermined compressive stress within the resilient bonding medium within a wheel of the character described in the present specification and in my former applications above noted.

Another object of the invention is to provide a method of assembling wheels of the present class to attain the pre-stressed condition described within the resilient bonding medium.

A further object of the invention is to provide a structure for resilient vehicle wheels of the pre-stressed class wherein the rim element inclusive of the blades, is designed to float within the enclosing structure of the hub element or the hub element including the blades, designed to float within the enclosing structure of the rim element.

A still further object of the invention is to provide a wheel structure as latterly indicated in which the blades of the floating member include a reinforcing means designed to function also as transverse blades to counteract side thrust conditions, such structure being a further development of the alternatives shown in my application Serial No. 726,643, above listed.

With these and other objects in view, my invention generally relates to the provision of a structure for resilient wheels of the class wherein the wheel is comprised of a rim element having blades separated from a hub element having blades by a resilient bonding medium, and wherein the resilient bonding medium is prestressed whereby under normal running conditions tensile stresses within the resilient bonding medium are substantially obviated.

My invention also relates to the assembly of wheels of this character wherein the resilient bonding medium is initially compressed by means of opposed side plates which are interconnected and which may be drawn together to compress the resilient bonding medium.

Other objects of the invention will be apparent from a study of the following specification taken in conjunction with the accompanying drawings.

In the drawings:

Figure 4 is an exploded view of an alternative structure of wheel, the clamping side plate having been eliminated from this drawing for clarity but shown in the following figures.

Figure 5 is a view 5—5 of the blades of Figure 4 but showing the resilient bonding medium within the structure.

Figure 6 is a view 6—6 of Figure 5.

Figure 7 is a further alternative structure of wheel, being an alternative to Figure 6 but showing a modification in the contour design of the members.

Figure 8 is a final modification wherein the clamping side plates are floating relative to the rim member and the hub member, the latter two being also separated by the resilient bonding medium.

Figure 1:
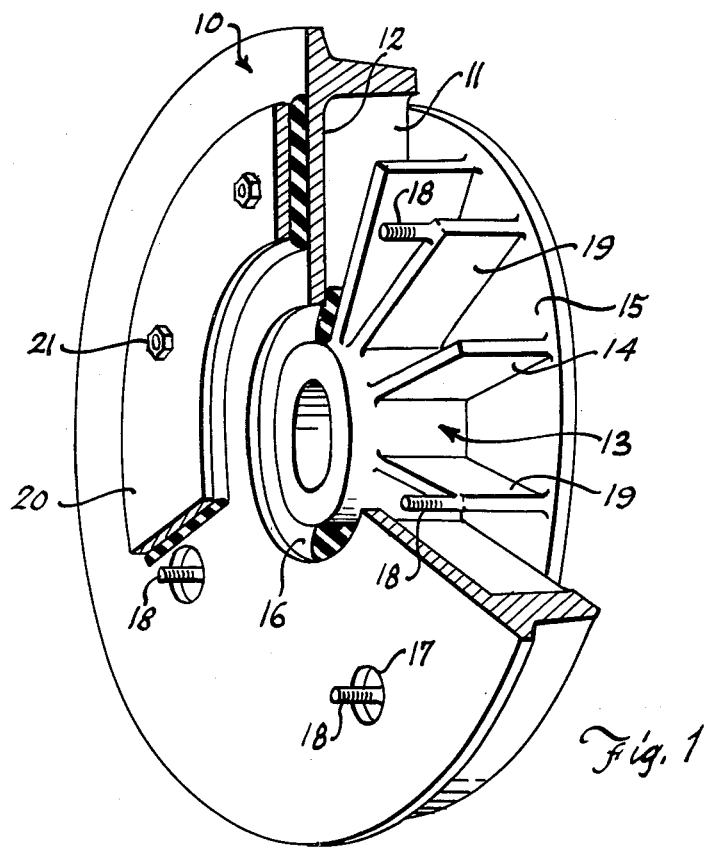
Figure 1 is a cut-away perspective view of a wheel according to my invention.

Referring to the drawings, a wheel of the class shown in my former applications is shown in Figure 1 comprised of a rim element 10 which includes inwardly extending blade members 11 integrally formed with the side plate 12. The hub element 13 has outwardly extending blades 14 integrally formed with the side plate 15. A resilient bonding medium 16 separates the constituents of the rim element 10 from the hub element 13 and holds these two components in spaced apart relation and isolated from one another.

The present invention concerns particularly, a means of controlling the stress characteristics within the wheel by pre-stressing the resilient bonding medium 16. This is accomplished in the form of Figure 1 by providing suitable orifices 17 in the side plate 12 and extending threaded shanks or bolts 18 preferably from alternate blades 19 of the hub element through these orifices to be attached to the ring plate 20 by means of suitable nuts 21 or the equivalent.

Figure 2:
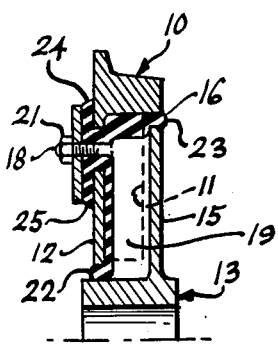
Figure 2 is a partial sectional view of the wheel of Figure 1.

Thus, in Figure 2, it will be apparent that when the rim element 10 and hub element 13 are assembled in a suitable jig in spaced apart relation and the resilient bonding material 16 is introduced between these components that the material 16 (preferably rubber) also extends through the orifices 17 and over a portion of the outer face of the side plate 12 to operate the ring plate 20 and hold the same in spaced apart relation from the side plate 12. Upon initial assembly where rubber is used as the resilient bonding medium, I vulcanize the rubber so that it adheres to the surfaces of the members of the rim and hub components. Thereafter, the resilient bonding medium is placed under a predetermined degree of initial compressive stress by tightening the nuts 21 or other suitable clamping or fastening means and causing the side plate 12 and side plate 15 to move closer together resulting in a slight bulging of the resilient bonding medium 16 at its free surfaces such as indicated at numerals 22, 23, 24 and 25.

The essential reason for compressing the resilient bonding material initially is that tensile stresses may substantially be avoided during normal use of the wheel. For instance, considering the condition under static load, the resilient bonding medium in the wheel in its upper regions would normally be under slight tension whereas the bonding medium in the lower region of the wheel would be under compression. If however, initial compressive stress were placed in the resilient bonding medium of a magnitude substantially equivalent to the amount of tensile stress which arises due to static load conditions, then a zero stress condition will be arrived at in the upper regions of the resilient bonding medium in the wheel under static load. Although I have described this condition with regard to static load alone, it will be appreciated that initial compressive stress may be effected in the resilient bonding medium to take care of further load conditions.

Various modifications of wheel structures of the instant class are shown incorporating the initial compressive stress feature in the resilient bonding medium. However, the adaptation of this feature is not limited necessarily to the modifications disclosed here.

Figure 3:
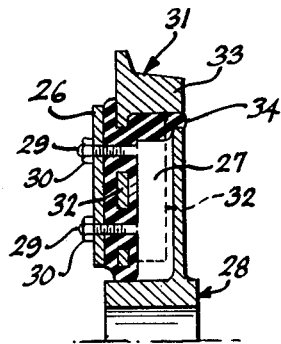
Figure 3 is a view similar to Figure 2 but discloses a clamping side plate of full depth.

The first modification is shown in Figure 3 which is merely a development of the form of Figure 2 wherein the ring plate 26 is of great depth and is designed to be connected to the blade 27 of the hub element 28 by a pair of connecting bolts 29 with the cooperating nuts 30. The rim element 31 is of similar character to that disclosed in Figure 1 having a side plate 32 with enlarged orifices designed for passage of the bolts 29 and blades 32 extending inwardly from integral connection with the rim 33 and side plate 32. As in the former construction, the resilient bonding medium 34 separates the rim and hub components, the hub component including for purposes of terminology, the ring plate 26 connected therewith.

Figure 4 shows a further alternative form of wheel of the pre-stressed type according to my invention, this figure being an exploded view of the wheel components, but not showing the second side plate. In this case, the rim element 35 is comprised of the rim 36, the inwardly extending blades 37 integrally formed with the side plate 38. A cooperating element of the clamping means in the form of suitable bolts 39 and 40 extends from the inner extension of the blades 37 and alternately from the root of said blades substantially as shown. In the left hand portion of this figure, the hub element 41 is comprised of the hub 42 having radially and outwardly extending blades 43 which incorporate the fins 44 whereby the section of the blade is substantially cross shaped in character. These fins are important because of two functions, namely the function of reinforcing each blade as to radial deflection and also the function of serving to reduce to a minimum axial deflection of the hub element relative to the rim element which occurs to a small degree when the wheel is on a vehicle which is rounding a sharp curve. As shown in Figure 6, the rim element 35 is separated from the hub element 41 by means of the resilient bonding medium 45 which is vulcanized to both elements. The other side plate required for the wheel of Figures 4 and 6 is shown in the latter figure, being indicated by the numeral 46 and connected to the rim 36 and a blade 37 by means of suitable clamping means such as the bolts 47 and nuts 48. It is important to note that the side plate 47 is in spaced apart relation to the elements of both the rim and the hub. This is necessary in order that the clamping means may be tightened to effect a predetermined degree of initial compressive stress in the resilient bonding medium 45. However, it will be readily apparent that where the designer is able to determine through trial and experiment, the degree of clamping required for the stress desired, the final computed position of the side plate 46 may be in engagement with the surfaces of the rim 36 and its blades 37. In this case however, the blades 43 of the hub 41 will still be in spaced apart relation to the parts of the rim element 35 and rim and hub elements will still be isolated one from the other by the resilient bonding medium.

Figure 5 shows a section of the assembled wheel of Figures 4 and 6 and illustrates the relative position of the rim blades 37 to the hub blades 43 within the resilient bonding medium 45, blades 43 being enclosed in this case by the structure of the rim element, that is to say, the rim blades 37 and the side plates 38 and 46.

Although I have shown in Figures 4 to 6 a wheel structure wherein the rim element is designed to enclose the blades of the hub element, it will be apparent that an alternative type of construction may be adopted wherein the hub element includes side members which enclose the blades of the rim element.

In Figure 7 such a structure is shown by a further slight modification concerning the shape of the side surfaces of the wheel which lends a more pleasing appearance to the wheel. In this case, the hub element 49 is comprised of the hub 50 having the outwardly flaring side plate 51 integrally formed with the hub blades 52. The rim element 53 is comprised of the rim 54 having simple blades 55 extending inwardly therefrom in spaced apart relation to the blades of the hub and to the side plate 51. In this figure, the rim 54 is displaced axially with regard to the hub 50 so that the hub connection for fastening the wheel to an axle will not extend outside of the side surfaces of the rim 54. This factor is particularly important where clearances for vehicles must be considered. In assembling this particular wheel, a side plate 56 is employed, which is connected to the blades 52 by means of suitable bolts 57 and nuts 58, the resilient bonding medium 59 serving to separate the rim and hub components as before. Where a wheel is of such character that a rim is displaced axially relative to the hub, the form shown in Figure 7 appears to be the most sound structurally.

The last modification to be disclosed is shown in Figure 8 and incorporates what I term "floating side plates" which provide a means for effecting initial compression in the resilient bonding medium. In this case, the hub element 60 is comprised of a hub 61 having blades 62 extending radially and outwardly therefrom. The rim element 63 is comprised of the rim 64 having blades 65 extending radially inwardly therefrom. The rim and hub elements are held in spaced apart relation in a suitable jig and a suitable sleeve 66 preferably of a fibre material is located and supported while the resilient bonding medium 66a is vulcanized to the rim and hub components. The sleeve 66 shown, is of predetermined length, the floating side plates 67 and 68 may be located relative to the rim and hub components of the wheel before vulcanizing if desired, and then after the rubber has been cured, the bolts 69 and 70 are tightened up to provide a predetermined compressive stress within the bonding medium 66a. This will be determined by the dimensional characteristics of the wheel components, resilient bonding medium and the length of the sleeve 66.

Where the resilient wheel of the present class is substantially enclosed as shown in the wheels above illustrated, I recommend the inclusion of breathing orifices 38a (see Figure 4) in at least one side plate of the wheel. Such orifices further ensure exercise of the resilient bonding medium during use to avoid cold flow in the bonding material.

What I claim as my invention is:

1. A wheel of the class having a rim member, a hub member, and a web component of comparatively large radial depth with respect to the radial depth of the rim and hub members and extending therebetween, wherein the web component comprises: blades extending radially from each of said members toward the other in intermeshing relationship, each blade being of substantial length but slightly less than the radial depth of the web component, a plate enclosing each side of the web component joined to one member and extending toward but spaced from the other, a resilient filler disposed between adjacent blades of the rim and hub members and extending radially for at least the entire overlapping surfaces of the blades to space one member and its blades and side plate from physical contact with the other member and the blades thereof, means for retaining said hub and rim members in assembled relation with one another comprising a structural element connected to one of said members and extending to partially overlie the exposed surfaces of the side plate of the other member, and adjustable fastening means forming a part of the structural element of said retaining means and adapted to be tightened to provide compressive stresses in said filler under no load conditions in said wheel.

2. A wheel of the class having a rim member, a hub member, and a web component of comparatively large radial depth with respect to the radial depth of the rim and hub members and extending therebetween, wherein the web component comprises: blades extending radially from each of said members toward the other in inter-meshing relationship, each blade being of substantial length but slightly less than the radial depth of the web component, a plate enclosing each side of the web component joined to one member and extending toward but spaced from the other, a resilient filler disposed between adjacent blades of the rim and hub members and extending radially for at least the entire overlapping surfaces of the blades to space one member and its blades and side plate from physical contact with the other member and the blades thereof, means for retaining said members in assembled relation comprising a structural element connected to one of said members and positioned to partially overlie the outer surfaces of the side plate of the other member, a resilient medium extending between opposed surfaces of said element and the side plate it overlies, and adjustable fastening means forming a part of the structural element of said retaining means and adapted to be tightened to provide compressive stresses in said filler under no load conditions in said wheel.

3. A wheel of the class having a rim member, a hub member, and a web component of comparatively large radial depth with respect to the radial depth of the rim and hub members and extending therebetween, wherein the web component comprises: blades extending radially from each of said members toward the other in intermeshing relationship, each blade being of substantial length but slightly less than the radial depth of the web component, a plate enclosing each side of the web component joined to one member and extending toward but spaced from the other, a resilient filler disposed between adjacent blades of the rim and hub members and extending radially for at least the entire overlapping surfaces of the blades to space one member and its blades and side plate from physical contact with the other member and the blades thereof, means for retaining said members in assembled relation comprising a ring-like element positioned to partially overlie the outer surfaces of the side plate of one of said members, a resilient medium extending between opposed surfaces of said element and the side plate it overlies, and adjustable tensioning means operatively extending between said ring-like element and the other of said members to provide initial compression in said resilient filler.

JAMES M. MacLEAN.

REFERENCES CITED

The following references are of record in the file of this patent:

UNITED STATES PATENTS

| Number | Name | Date |
|---|---|---|
| 85,693 | Raddin | Jan. 5, 1869 |
| 505,572 | Maxim | Sept. 26, 1893 |
| 1,122,620 | Madden | Dec. 29, 1914 |
| 1,257,974 | Brophy | Mar. 5, 1918 |
| 1,693,576 | Hale | Nov. 27, 1928 |
| 2,050,441 | Mead | Aug. 11, 1936 |
| 2,409,052 | MacLean | Oct. 8, 1946 |
| 2,532,319 | MacLean | Dec. 5, 1950 |